A. POTTER.
TRAIN PIPE COUPLING.
APPLICATION FILED AUG. 13, 1910.

994,479.

Patented June 6, 1911.
3 SHEETS—SHEET 1.

Witnesses
Albert A. Hofmann
E. M. Brown

Inventor
Albert Potter.
By Edward N. Pagelsen,
Attorney

A. POTTER.
TRAIN PIPE COUPLING.
APPLICATION FILED AUG. 13, 1910.

994,479.

Patented June 6, 1911.
3 SHEETS—SHEET 2.

Witnesses
Albert A. Hofmann.
Elizabeth M. Brown.

Inventor
Albert Potter.
By Edward N. Pagelsen.
Attorney

A. POTTER.
TRAIN PIPE COUPLING.
APPLICATION FILED AUG. 13, 1910.
994,479.
Patented June 6, 1911.
3 SHEETS—SHEET 3.
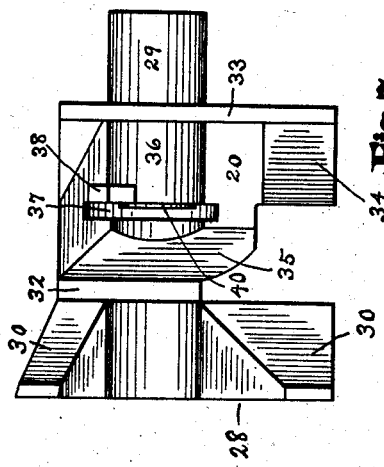
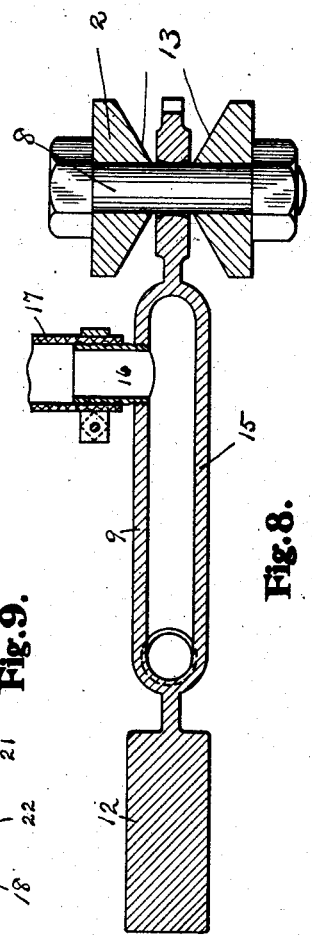
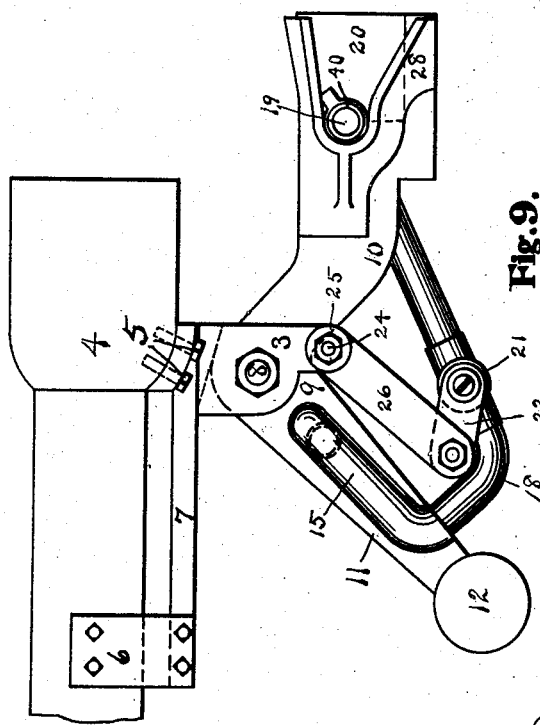
Witnesses
Albert A. Hofmann
E. M. Brown
Inventor
Albert Potter.
By Edward N. Pagelsen.
Attorney

UNITED STATES PATENT OFFICE.

ALBERT POTTER, OF DETROIT, MICHIGAN.

TRAIN-PIPE COUPLING.

994,479.  Specification of Letters Patent.  Patented June 6, 1911.

Application filed August 13, 1910. Serial No. 577,010.

*To all whom it may concern:*

Be it known that I, ALBERT POTTER, a citizen of the United States, and a resident of Detroit, in the county of Wayne and State of Michigan, have invented a new and useful Train-Pipe Coupling, of which the following is a specification.

This invention relates to coupling devices particularly for the air pipes of railway-car air-brakes, and the object of this construction is to provide an automatic coupler which can be applied to any car equipped with any of the automatic couplers sanctioned by the Master Carbuilders Association.

Figure 3:
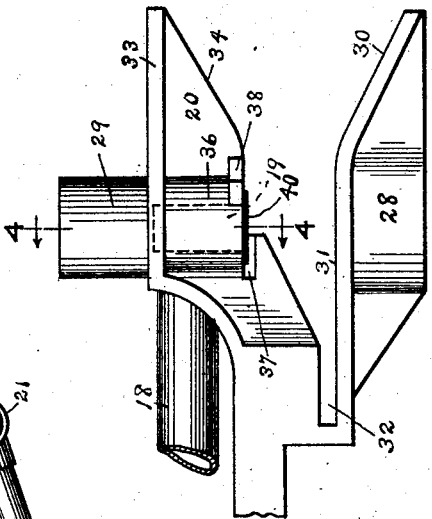
Figure 1:
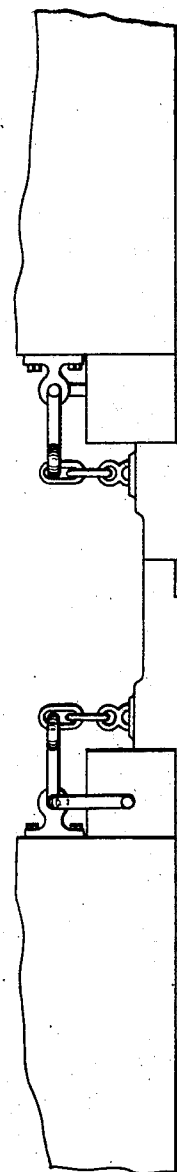
Figure 1:
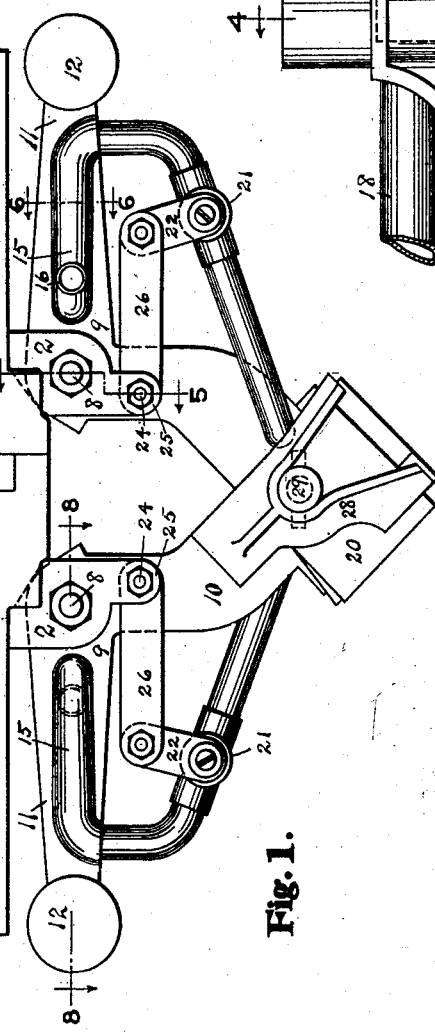
Figure 4:
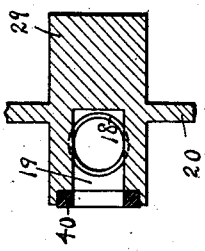
Figure 2:
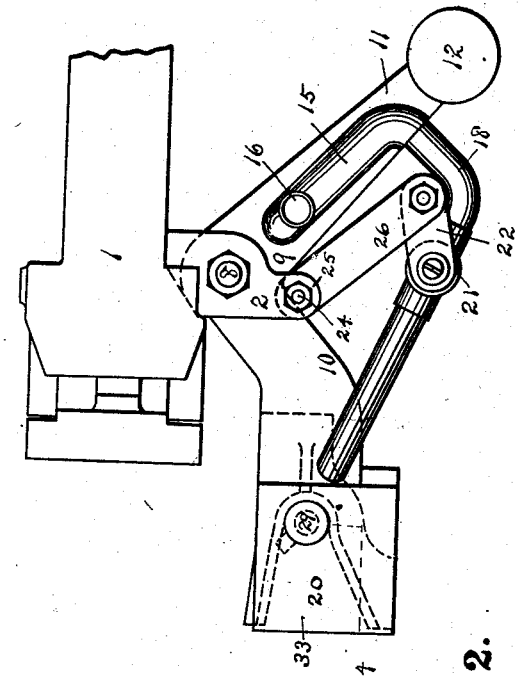
Figure 6:
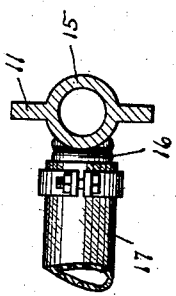
Figure 5:
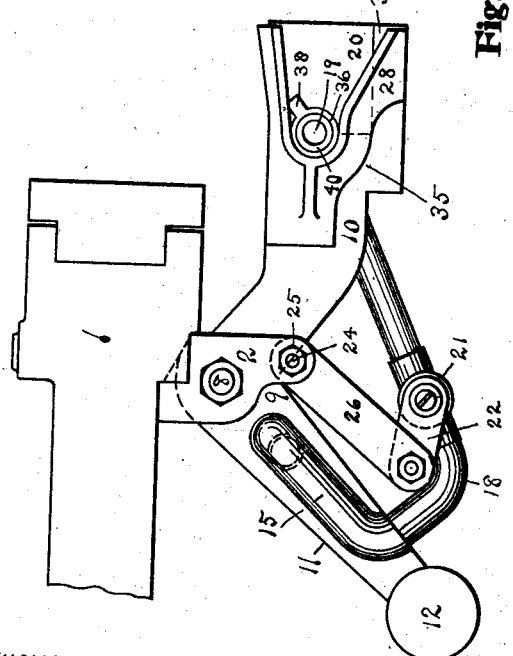
Figure 5:
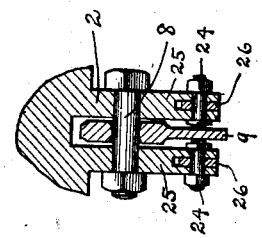

In the accompanying drawings, Figure 1 is an elevation of this improved coupler attached to two connected draw-bars. Fig. 2 is an elevation showing the coupler in position to engage. Fig. 3 is a plan of the engaging jaws. Fig. 4 is a cross section on the line 4—4 of Fig. 3. Fig. 5 is a cross section on the line 5—5 of Fig. 1. Fig. 6 is a cross section on the line 6—6 of Fig. 1. Fig. 7 is an end elevation of the engaging jaws. Fig. 8 is a cross section on the line 8—8 of Fig. 1 and, together with Figs. 3, 4, 6 and 7, is on a larger scale than the others. Fig. 9 is an elevation of a slightly modified form of the device.

Similar reference characters refer to like parts throughout the several views.

In making up trains, the air-pipes of the various cars are now coupled by hand, necessitating the brakeman getting under the car-coupling to join the flexible ends of the train pipes. To avoid this, the present device is so constructed that it will connect and disconnect automatically, without requiring any adjustment. Means are also provided for admitting the air to the coupling when made and cutting the air off when the coupling is broken.

The draw-bars 1 are shown in a conventional manner, as no part of the invention resides therein. Figs. 1 and 2 show a bracket 2 formed integral with the draw-bar while Fig. 9 shows the bracket 3 connected to the draw-bar 4 by bolts 5. Plates 6 may connect the rear end of the brace 7 to the draw-bar and thereby brace the brackets 3. The other details of the couplers of the drawings are the same.

The brackets 2 carry the bolts 8 on each of which is mounted a lever 9, the front arm 10 of which carries the engaging jaws, and the rear arm 11 the counterweight 12. As cars swing from side to side, the lever 9 must yield to this movement. The inner sides 13 of the bracket are therefore beveled on each side of the bolt 8, as shown in Fig. 8, to permit the lever to swing laterally. But because of the manner in which the parts are pivoted, the engaging jaws will normally resume their positions central with the car and draw-bar.

The arm 11 of the lever 9 may be formed with an air passage within the enlargement 15, which terminates in a nipple 16 onto which may be connected a flexible end 17 of the air-pipe of the car. A pipe 18 connects to this passage in the arm 9 and to the engaging jaw 20, which has a bore 19. In this pipe 18 is a valve 21 having operating levers 22 connected to each end of the valve plug. These levers connect to the pins 24 in the lugs 25 on the brackets 2 or 3 by means of links 26. It will be seen in Fig. 1 that when the coupling is made, these levers 22 are at substantially right angles to the line of the valve 21, while Fig. 2 shows this angle to be acute when the parts are not coupled. The valve is open when the parts are in the position shown in Fig. 1, and closed when in the position shown in Fig. 2.

The engaging jaws 20 and 28 are mounted on the ends of the arms 10. The jaw 28 is bifurcated so as to receive the outer cylindrical projection 29 of the coupling device of the other car as shown in Fig. 1. The inner face of the jaw 28 has an inclined portion 30 and a longitudinal portion 31. A slot 32 (Figs. 3 and 7) receives the thin longitudinal portion 33 of the other coupling device. The jaw 20 has an inclined portion 34, stiffening portion 35, the cylindrical projections 29 and 36, and a slot 37. A lip 38 extends from the projection 36 and is adapted to enter the slot 37 of the coupling device of the other car.

When the parts are in the positions shown in Fig. 2, and approach each other, each jaw 20 will slip in between the two opposite jaws, the inclines 34 engaging until the edges of the plates 33 enter the slots 32. The lips 38 on the cylindrical portions will enter the slots 37 and the cylindrical projections 29 will enter the forks of the jaws 20. When the projections 29 engage the bottoms of the forks, further movement of the draw-bars toward each other will cause the coupler to swing down, as shown in Fig. 1, when the parts will interlock. Washers 40 or rubber or other suitable material fit in grooves around the bores 19 and insure tight joints.

When the draw-bars couple, there is no chance for the air-pipe coupling to disengage. The construction permits vertical movement of the brackets 2 relative to each other without breaking the joint.

The proportions and dimensions of the various parts will depend upon the size and character of the cars on which these air-pipe couplers are mounted and the details may be changed, within the scope of the claims, without departing from the spirit of my invention.

Having now explained my construction, what I claim as my invention and desire to secure by Letters Patent is:—

1. In a pipe-coupling for railway cars, the combination with the draw-bar, of a bracket extending downward from the same, a pivot carried by said bracket, a lever mounted thereon, a counterweight on one arm of the lever, engaging jaws on the other arm, a pipe extending between said arms, a valve in said pipe, and means for opening and closing said valve.

2. In a pipe-coupling for railway cars, the combination with the draw-bar, of a bracket extending downward from the central line of the same, a horizontal pivot mounted in the bracket at right angles to the line of the draw-bar, a lever mounted on said pivot in the same vertical plane with the draw-bar, engaging jaws at the outer end of the lever, an air-pipe connected to said jaws, an air-valve mounted on said lever and movable with the same, and means whereby the valve is positioned by the lever and the flow of air through said pipe is controlled.

3. In a pipe-coupling for railway cars, the combination with the draw-bar, of a bracket mounted thereon, a lever fulcrumed on the bracket to move in the vertical plane of the draw-bar, the arms of said lever being at an angle to each other, a counterweight on the end of the inner arm, a pair of jaws on the end of the outer arm having adjacent faces inclined, and an air-pipe connected to said jaws.

4. In a pipe-coupling for railway cars, the combination with the draw-bar, of a bracket mounted thereon, a lever fulcrumed on the bracket to move in the vertical plane of the draw-bar, the arms of said lever being at an angle to each other, a counterweight on the end of the inner arm, a pair of jaws on the end of the outer arm, one of the jaws being bifurcated and the other having a cylindrical projection adapted to fit into the bifurcated jaw of a similar coupling, both of the jaws having adjacent faces beveled and formed to receive a jaw of a similar coupling between them, and an air-pipe connected to said jaws.

5. In a pipe-coupling for railway cars, the combination with the draw-bar, of a bracket mounted thereon, a lever fulcrumed on the bracket to move in the vertical plane of the draw-bar, the arms of said lever being at an angle to each other, a counterweight on the end of the inner arm, a pair of jaws on the end of the outer arm, one of said jaws being bifurcated and the other having a cylindrical projection adapted to fit into the bifurcated jaw of a similar coupling, said jaws having projections for interlocking with a similar coupling, and an air-pipe connected to said jaws.

6. In a pipe-coupling for railway cars, the combination with the draw-bar, of a bracket mounted thereon, a lever fulcrumed on the bracket to move in the vertical plane of the draw-bar, the arms of said lever being at an angle to each other, a counterweight on the end of the inner arm, said inner arm normally inclined downward and the outer arm normally horizontal, jaws on the end of the outer arm formed to connect with jaws of a similar coupling, an air-pipe connected to said jaws, a valve in said air-pipe, and a link connecting the lever and valve whereby the lever may open and close the valve.

7. In a pipe-coupling for railway cars, the combination with the draw-bars, of a bracket mounted thereon, a lever fulcrumed on the bracket to move in the vertical plane of the draw-bar, the arms of said lever being at an angle to each other, a counterweight on the end of the inner arm, said inner arm normally inclined downward and adapted to swing upward and the outer arm normally horizontal and adapted to swing downward, jaws on the end of the outer arm adapted to connect with the jaws of a similar coupling, an air-pipe mounted on said lever and connected to said jaws, a valve in said pipe, and means connected to said bracket to close the valve when the outer lever arm is horizontal and to open said valve when the inner arm is horizontal.

In testimony whereof I have signed this specification in the presence of two subscribing witnesses.

ALBERT POTTER.

Witnesses:
J. H. DOUGHERTY,
M. E. PIER.

---

Copies of this patent may be obtained for five cents each, by addressing the "Commissioner of Patents, Washington, D. C."